United States Patent [19]

Gratzfeld et al.

[11] Patent Number: 4,915,742

[45] Date of Patent: Apr. 10, 1990

[54] IRON BLUE PIGMENT, PROCESS FOR ITS PIGMENTATION AND USE

[75] Inventors: Everhard Gratzfeld, Wesseling; Eva Clausen, Cologne; Heinrich Winkeler, Wesseling, all of Fed. Rep. of Germany

[73] Assignee: Degussa Aktiengesellschaft, Frankfurt, Fed. Rep. of Germany

[21] Appl. No.: 281,988

[22] Filed: Dec. 9, 1988

[30] Foreign Application Priority Data

Dec. 16, 1987 [DE] Fed. Rep. of Germany ....... 3742628

[51] Int. Cl.$^4$ .............................................. B32B 19/00
[52] U.S. Cl. .................................... 106/418; 106/439; 106/456
[58] Field of Search ........................ 106/418, 439, 456

[56] References Cited

U.S. PATENT DOCUMENTS 4,047,969  9/1977  Armanini ............................. 106/418
4,309,480  1/1982  Armanini ............................. 106/418

Primary Examiner—Peter D. Rosenberg
Attorney, Agent, or Firm—Beveridge, DeGrandi & Weilacher

[57] ABSTRACT

Iron blue characterized by an ammonium content of ±5.5 weight %, a potassium content of <0.1 weight %, a sodium content of <0.1 weight %, a color strength in a toluene intaglio printing ink up to 15% greater than the standard Vossen blue 705/80 (calculated in accordance with DIN 53 234) and the color spacings (determined in accordance with DIN 6174 relative to Vossen blue 705/80 as standard) of $$\Delta a^*: 6.5 \pm 0.5$$

$$\Delta b^*: 1.3 \pm 0.3$$

$$\Delta c^*: -1.5 \pm 0.5$$

It is prepared by placing an aqueous solution of sodium hexacyanoferrate (II) in a reaction vessel at a pH of 7.0 and a concentration of $45 \pm 5$ g/l, calculated as $Fe(CN)_6$ together with ammonium sulfate having a concentration of $14 \pm 1$ g/l at a temperature of 22°–23° C., adding an aqueous iron-II sulfate solution at a pH of 2.0, a concentration of $100 \pm 10$ g/l, and a temperature of 22°–23° C., and precipitating the white dough until an excess of iron up to 1.4–1.7/1, calculated as Fe, is attained in the filtrate, then washing the white dough by decantation until the filtrate indicates a conductivity of 5000 to 5500 $\mu$S and has an excess of iron of 0.1–0.2 g/l, calculated as Fe in the filtrate, then stirring in $58 \pm 6$ g ammonium sulfate and boiling the white dough for a period of $\geq 2$ hours, thereupon adding, at a temperature of 70°±5° C., first $\geq 90$ g HCl as a 10–15% aqueous solution, then $\geq 51$ g sodium chlorate as an aqueous solution having a concentration $270 \pm 30$ g/l. The iron blue pigment can be used in printing inks.

5 Claims, No Drawings

IRON BLUE PIGMENT, PROCESS FOR ITS PIGMENTATION AND USE

INTRODUCTION AND BACKGROUND

The present invention relates to an iron blue pigment, the process for its preparation and use.

Iron blue pigment (DIN 55 906) is known under the designations Berlin blue, Paris blue, Prussian blue, Milori blue, steel blue ferrocyanic blue and bronz blue. In the English-language, iron blue pigment is also designated as "iron blue" (Ullmann's Encyclopedia of Technical Chemistry, 4th ed., Vol. 17, pages 623 ff.)

Iron blue pigment is valued in the printing and lacquer ink industries and for the coloring of fungicides, because of its high color intensity and its low price as compared with organic pigments.

Iron blue pigment is an alkali ferriferrocyanide having the general formula $Me(I)Fe(III)Fe(II)(CN)_6 \cdot H_2O$, where Me(I) is a monovalent alkali metal ion.

The preparation of iron blue pigments is carried out by precipitation from hexacyanoferrate(II) solutions and iron(II) salt solutions via the so-called "white dough" or "Berlin white", which has the general formula $Me(I)_2Fe(II)Fe(II)(CN)_6 \cdot H_2O$, which is optionally oxidized while adding alkali metal salts after a heat treatment (aging).

After a heat treatment (aging) while optionally adding alkali metal salts the precipitation is oxidized.

Only iron blue pigment compounds that contain in their molecules chiefly potassium and/or ammonium ions as the alkali metal have a character suitable for coloring technology and thus have practical significance for the pigment processing industry.

An iron blue pigment is known from German OLS No. 3,038,285, which is characterized by a potassium content of 7.0-9.0 weight %, preferably 7.6-9.0 weight %, and a sodium content of 0.5-2.0 weight %, preferably 0.5 to 1.5 weight %.

The known iron blue pigment is identical to Vossen blue 705/80. Intaglio printing inks prepared therewith are up to 15% weaker in color and contain no red fraction.

It is known that the nature and quantity of alkali metal present in the Berlin blue lattice are not only the cause of the color strength and depth, but that they also affect the hue. What is meant in particular is the undertone which becomes visible in transparent layers. The color of the alkali metals present in Berlin blue obviously corresponds to their spectral lines in the coloring of flames. The alkali metals used in the preparation of this blue pigment on a large scale are sodium potassium and ammonium. Sodium has yellow spectral lines, potassium violet, and ammonium strong violet lines.

Known red-tinged blue pigments are manufactured with the general designation "toning blue". The red hue is achieved by an adsorption of $NH_3$ on the pigment surface. $NH_3$ is formed from the ammonium salt present in the suspension during the white-dough oxidation in the alkaline region.

The oxidation is carried out with sodium dichromate. Chromium remains as $Cr(OH)_3$, along with the $Fe(OH)_2$ [$Fe(OH)_3$], which is likewise precipitated, as a disturbing compound in the pigment. The great disadvantage of these types of toning blue lies in the fact that $NH_3$ is dissolved from the pigment binder. In addition, $NH_3$ is displaced by the effects of heat. In this way, the red portion of the pigment disappears immediately. Because of its instability, this coloring agent is no longer manufactured.

SUMMARY OF THE INVENTION

An object of the invention is to provide an iron blue pigment characterized by an ammonium content of equal to or greater than 5.5 weight %, a potassium content of 0.1 weight %, a sodium content of less than 0.1 weight %, a color strength in a toluene intaglio printing ink up to 15% greater than the standard Vossen blue 705/80 (calculated in accordance with DIN 53 234), and the color spacings (determined in accordance with DIN 6174 relative to Vossen blue 705/80) as the standard of:

$\Delta a^* : 6.5 \pm 0.5$ $\Delta b^* : 1.3 \pm 0.3$ $\Delta c^* : -1.5 \pm 0.5$ The iron blue pigment according to the invention can have a loss of drying (residual water content) of about 3.5 weight % (determined in accordance with DIN 53,198) and a CN content of about 49 weight % (determined in accordance with the Feld method).

A further object of the invention is to provide process for the preparation of the iron blue pigment embodying the invention, which is characterized by the fact that an aqueous solution of sodium hexacyanoferrate(II) is placed in a reaction vessel at a pH of 7.0 and a concentration of $45 \pm 5$ g/l, calculated as $Fe(CN)_6$, together with ammonium sulfate having a concentration of $14 \pm 1$ g/l at a temperature of 22 to 23° C.; an aqueous solution of iron(II) sulfate having a pH of 2.0, a concentration of $100 \pm 10$ g/l, and a temperature of 22–23° C. is added, and the white dough is precipitated, with an excess of iron of up to 1.4 –1.7 g/l, calculated as Fe, in the filtrate. The white dough is then washed by decantation until the filtrate indicates a conductivity of 5000 to 5500 μS and has an excess of iron of 0.1–0.2 g/l. After that, $58 \pm 6$ g ammonium sulfate is stirred in and the white dough is boiled for a period of $\geq 2$ hours. Then, at a temperature of $70 \pm 5°$ C., $\geq 51$ g sodium chlorate is added as an aqueous solution having a concentration of $270 \pm 30$ g/l.

The data for the preparation, in accordance with the invention, of the iron blue pigment incorporating the invention appear to differ little from the prior art methods. But there is a critical difference in the preparation of the pigment according the invention. The Berlin white dough precipitated from sodium ferrocyanide is washed largely salt-free by decantation.

This freedom from salt is a prerequisite for the complete exchange of sodium for ammonium in the Berlin white molecule.

The analytical values for the iron blue pigment of the invention are unusual and advantageous. High contents of cyanide, iron and ammonium, with the sodium content being low at the same time, cause high color strength and a beautiful violet hue.

The analytical values correspond to the composition of the Berlin blue lattice. For the first time, it was possible to achieve this ideal condition.

The most valuable property of the new pigment for the application is the red-tinged hue. Such a pigment has been sought for years for shading purposes, especially in intaglio printing. But interesting possibilities for application can also be expected in the preparation of metal and automotive coatings.

DETAILED DESCRIPTION OF THE INVENTION

The process of the invention will be illustrated and described in more detail in conjunction with the example below:

The iron blue pigments are tested in a toluene intaglio printing ink having the following composition:
- 15.15 weight % pigment
- 26.65 weight % pigment
- 58.20 weight % solvent.

Dispersion is effected with the aid of the shake in accordance with DIN 53 238, part 10. The printing inks thus obtained are pressed on printing carriers with a flat hand press. The color matching is effected on a printing field obtained from 20 μm pan depth of the printing plate in accordance with DIN 6174. The resin and solvent are well known in the art and any suitable ones can be used in an amount sufficient to produce an ink composition for printing purposes.

EXAMPLE

Initial charge:
  $Na_4[Fe(CN)_6] \cdot 10\ H_2O$ dissolved in water =372 g $[Fe(CN)_6]+116$ g $(NH_4)_2SO_4$ Concentration 45 g/l $[Fe(CN)_6]$ pH about 7.0
  Temperature 22 –23° C.
Precipitation solution:
  about 740 g $FeSO_4 \cdot 7H_2O$ dissolved in water Concentration 100 g/l pH 2.0
  Temperature 22–23° C.
Precipitation time: 1 hour The white dough is precipitated until an iron excess of 6.5–7.5 is attained (ml $KMnO_4$ solution, 0.02 mol/l consumed per 25 ml filtrate). This corresponds to an Fe content of 1.4–1.7 g/l.

Flocculation of white dough:
  1350 ml Sedipur NF 102 solution, 0.05% in water=0.12% Sedipur NF 102 based on pigment. Sedipur $^{(200)}$ NF 102 is a non-ionogenic flocculating agent made from polyacrylamine. (Manufactured by BASF)

Washing of the white dough.
  The white dough is diluted with water to 18 liters; after sedimentation, 50% of the supernatant salt solution is removed and the dough is again diluted to 18 liters. The decantation of the white dough is carried out four times in all.

After decantation, the filtrate exhibits a conductivity of 5000–5500 μS and an excess of iron of 0.5–1.0.

Addition of ammonium sulfate:
  After removal of the last wash water, the batch is stirred with 58 g $(NH_4)_2SO_4$ for 30

Boiling of white dough: 2 hours

Oxidation:
  90 g HCl as a 10–15% aqueous solution is added at 70° C.; the batch is stirred for 5 minutes, 51 g $NaClO_3$ is then added as an aqueous solution, ca. 270 g/l.

The resulting blue pigment is compared with known blue pigments in Tables 1 and 2.

The blue pigment in accordance with the invention has the following advantageous characteristics:
  high color strength;
  extremely high proportion of red, characterized by the large positive difference in a* (color spacing as mentioned above) with the known iron blue pigments shown by way of reference.

TABLE 1

| Analytical chemical examination. | | | | | | |
|---|---|---|---|---|---|---|
| | Designation | | | | | |
| | Vossen Blue 705/80 | Daicolor 690 | Manox Blue 155 | Manox Blue 298 | Milori Blue x 3434 | Example 1 |
| | Manufacturer | | | | | |
| | Degussa | Dainishi Seika | Manox Ltd. | Manox Ltd. | Ciba Geigy | Degussa |
| Loss of drying (%) | 4.0 | 2.1 | 2.3 | 4.8 | 3.5 | 2.6 |
| Fe[(CN)$_6$]$^{-4}$ (%) | 61.3 | 63.9 | 60.9 | 60.8 | 60.4 | 66.4 |
| Uncomplexed Fe (%) | 18.4 | 17.8 | 17.2 | 18.8 | 17.4 | 19.3 |
| K (%) | 8.7 | ND | 0.5 | ND | ND | traces |
| Na (%) | 1.3 | 1.4 | 1.9 | 1.13 | 1.0 | <0.1 |
| NH$_4$ (%) | 0.5 | 4.3 | 3.5 | 3.60 | 4.0 | 5.49 |
| DBA adsorption (mg-equivs/kg) | 130 | 82 | ** | 118 | ** | 86 |

ND = not detectable

TABLE 2

| Technical application testing: Dispersion-shaking machine according to DIN 53,238, Part 10 Toluene intaglio printing, proofs made at 65 g/m$^2$ | | | | | | |
|---|---|---|---|---|---|---|
| | Designation | | | | | |
| | Vossen Blue 705/80 | Daicolor 690 | Manox Blue 155 | Manox Blue 298 | Milori Blue x 3434 | Example 1 |
| | Manufacturer | | | | | |
| | Degussa | Dainishi Seika | Manox Ltd. | Manox Ltd. | Ciba Geigy | Degussa |
| Color strength (%) | 100 | 85 | 78 | 94 | 101 | 115 |

TABLE 2-continued

Technical application testing: Dispersion-shaking machine according to DIN 53,238, Part 10 Toluene intaglio printing, proofs made at 65 g/m²

| | Designation | | | | | |
|---|---|---|---|---|---|---|
| | Vossen Blue 705/80 | Daicolor 690 | Manox Blue 155 | Manox Blue 298 | Milori Blue x 3434 | Example 1 |
| | Manufacturer | | | | | |
| | Degussa | Dainishi Seika | Manox Ltd. | Manox Ltd. | Ciba Geigy | Degussa |
| Color values: | | | | | | |
| a* | Ref. | −2.1 | −5.9 | −1.3 | −2.1 | 6.8 |
| b* | Ref. | 3.3 | 4.5 | 3.3 | 1.4 | 1.3 |
| c* | Ref. | −3.5 | −4.6 | −3.4 | −1.6 | −1.5 |

Ref. = Reference standard

We claim:

1. An iron blue pigment characterized by an ammonium content of ≧5.5 weight %, a potassium content of <0.1 weight %, a sodium content of <0.weight %, a color strength in a toluene intaglio printing ink up to 15% greater than the standard Vossen blue 705/80 (calculated in accordance with DIN 53 234) and the color spacings (determined in accordance with DIN 6174, relative to Vossen blue 705/80 as standard) of $\Delta a^*: 6.5 \pm 0.5$ $\Delta b^*: 1.3 \pm 0.3$ $\Delta c^*: -5 \pm 0.5$ 2. The iron blue pigment of claim 1 which is a solid substance.

3. A process for the preparation of an iron blue pigment characterized by an ammonium content of ≧5.5 weight %, a potassium content of <0.1 weight %, a sodium content of <0.1 weight %, a color strength in a toluene intaglio printing ink up to 15% greater than the standard Vossen blue 705/80 (calculated in accordance with DIN 53 234) and the color spacings (determined in accordance with DIN 6174, relative to Vossen blue 705/80 as standard of $\Delta a^*: 6.5 \pm 0.5$ $\Delta b^*: 1.3 \pm 0.3$ $\Delta c^*: -1.5 \pm 0.5$ said process consisting essentially of placing an aqueous solution of sodium hexacyanoferrate (II) in a reaction vessel at a pH of 7.0 and a concentration of 45±5 g/l, calculated as Fe(CN)₆, together with ammonium sulfate having a concentration of 14±1 g/l at a temperature of 22–23° C., adding an aqueous solution of iron (II) sulfate having a pH of 2.0, a concentration of 100±10 g/l, and a temperature of 22–23° C. to thereby precipitate a white dough, with an excess of iron of up to 1.4–1.7 g/l, calculated as Fe, in the resulting filtrate, washing the white dough by decantation until the filtrate indicates a conductivity of 5000 to 5500 μS and has an excess of iron of 0.1–0.2 g/l, calculated as Fe in the filtrate, thereafter stirring is 58±6 g ammonium sulfate and boiling the white dough for a period of ≧2 hours, thereafter adding, at a temperature of 70±5° C., first ≧90 g HCl as a 10–15% aqueous solution, then adding ≧51 g sodium chlorate as an aqueous solution having a concentration of 270±30 g/l and recovering the product.

4. A printing ink composition containing the iron blue pigment of claim 1 and a sufficient amount of solvent in order to obtain a composition suitable for intaglio printing.

5. The iron blue pigment of claim 1 which has a red-tinged hue.

* * * * *